United States Patent [19]
Nicoll et al.

[11] Patent Number: 5,828,043
[45] Date of Patent: Oct. 27, 1998

[54] CARD READER SYSTEM INCLUDING AN INVALIDATING DEVICE

[75] Inventors: Kenneth A. Nicoll, Dundee; Robert J. Suttie, Perthshire; Alexander W. Logie, West Lothian; David C. C. May, Fife, all of Scotland

[73] Assignee: NCR Corporation, Dayton, Ohio

[21] Appl. No.: 680,086

[22] Filed: Jul. 15, 1996

[30] Foreign Application Priority Data

Dec. 14, 1995 [GB] United Kingdom ............... 9525523

[51] Int. Cl.⁶ .................. G06K 7/08; G06K 5/00
[52] U.S. Cl. .................. 235/380; 235/440; 235/486
[58] Field of Search .................. 235/380, 442, 235/449, 486

[56] References Cited

U.S. PATENT DOCUMENTS

| | | |
|---|---|---|
| 3,655,946 | 4/1972 | Morita et al. ............... 235/431 |
| 3,818,187 | 6/1974 | Lovendusky et al. ............... 235/380 |
| 4,035,614 | 7/1977 | Frattarola et al. ............... 235/431 |
| 4,128,757 | 12/1978 | Garner, Jr. ............... 235/383 |
| 4,361,755 | 11/1982 | Sidline et al. ............... 235/476 |
| 4,487,488 | 12/1984 | Burbank, III ............... 353/122 |
| 5,303,921 | 4/1994 | Breeding ............... 273/149 R |
| 5,317,137 | 5/1994 | Wilkins ............... 235/380 |
| 5,424,522 | 6/1995 | Iwata ............... 235/434 |

*Primary Examiner*—Donald T. Hajec
*Assistant Examiner*—Douglas X. Rodriguez
*Attorney, Agent, or Firm*—Michael Chan

[57] ABSTRACT

The invention relates to a card reader system (10) including a detector (58') for determining a predetermined irregular mode of operation of the reader system. The invention is characterized by a card invalidation device (21, 24, 26) operable to render a card (2) permanently non-usable in response to the detection of the predetermined irregular mode of operation.

4 Claims, 5 Drawing Sheets

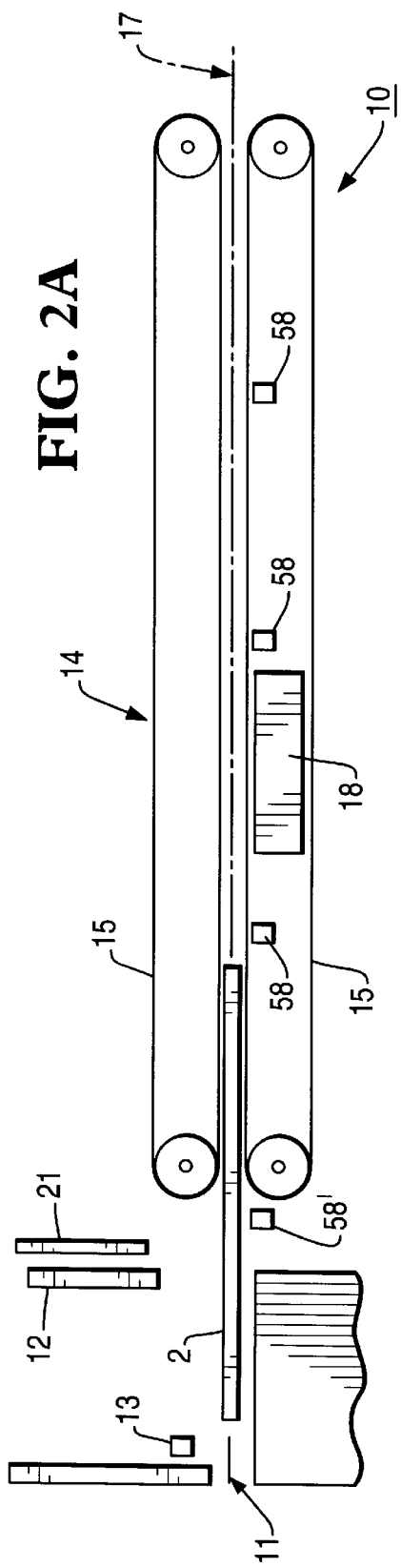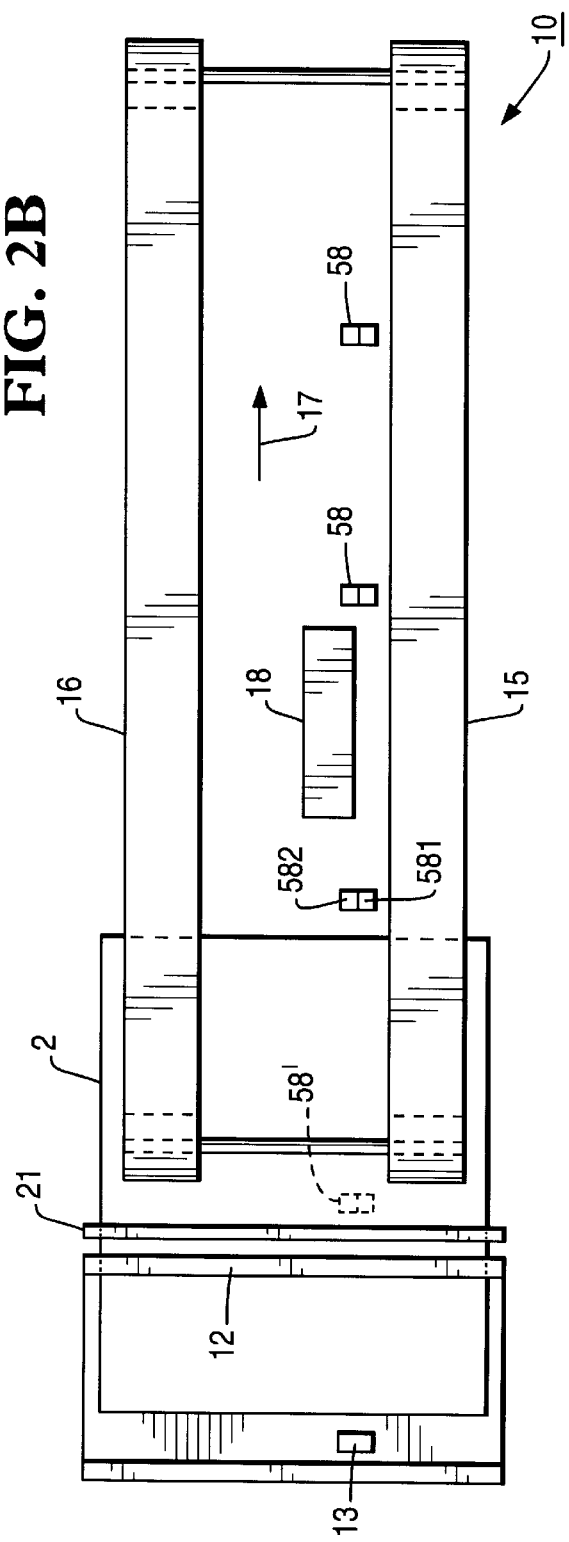

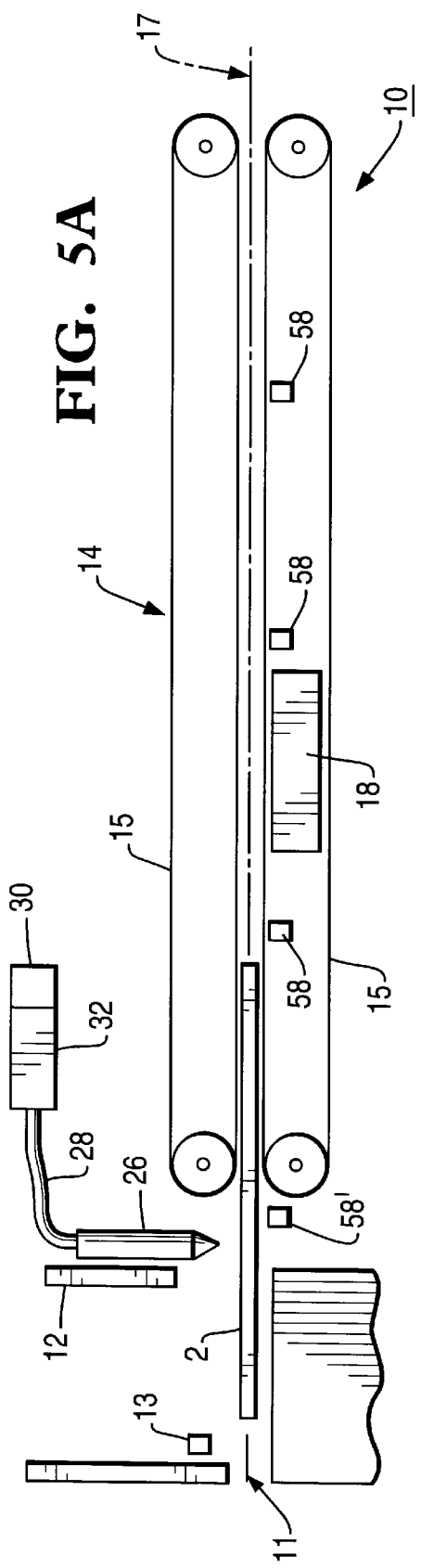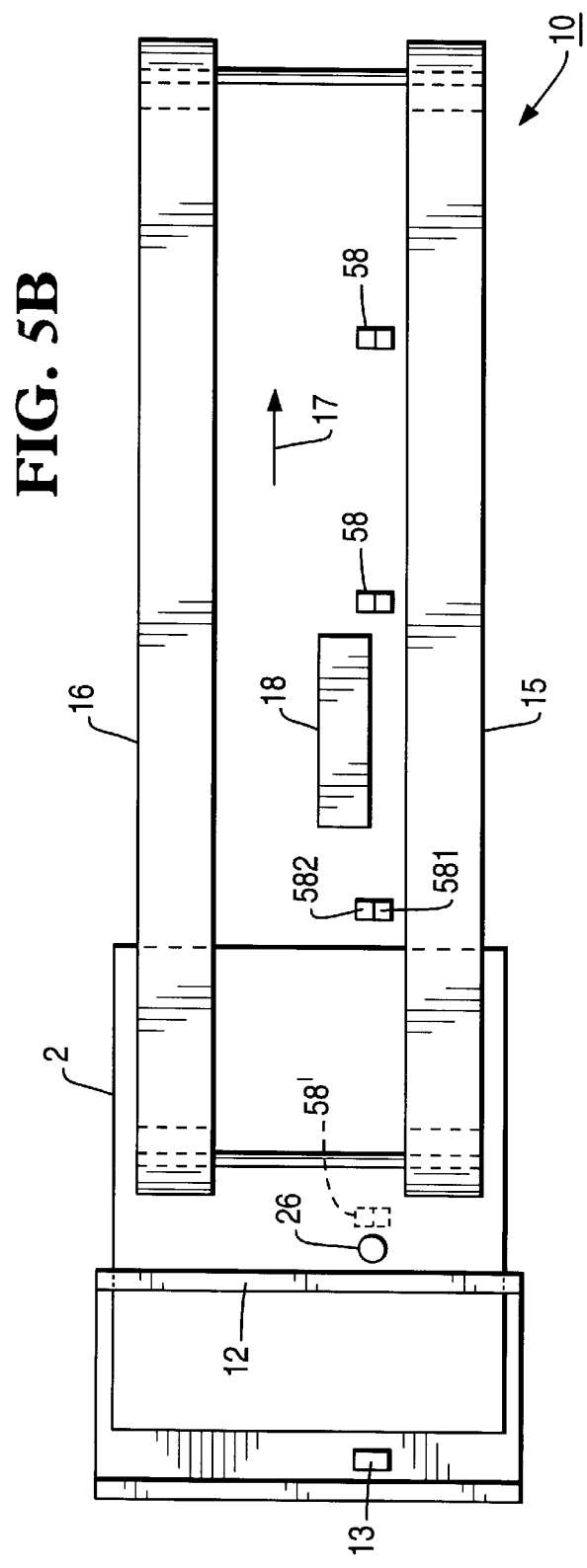

CARD READER SYSTEM INCLUDING AN INVALIDATING DEVICE

BACKGROUND OF THE INVENTION

This invention relates to a card reader and to a card reader/writer The invention has application, for example, to a card reader for use in a transaction terminal such as an automated teller machine (ATM).

There are presently two types of card that can be used in an ATM: a magnetic stripe card; and an integrated circuit (IC) card. IC cards carry an IC chip which can be configured to provide a variety of functions. IC cards are commonly referred to as "smart cards", and are well known to persons skilled in the art.

Both types of card can store a variety of encoded user information, such as, account information, or user identification information in the form of a so called PIN (Personal Identification Number) which is required by an ATM before the ATM will grant a user access to the services provided by the ATM.

Many such cards are multipurpose cards which function not only as a user identification card for use with ATMs, but also as a cheque guarantee card, and/or as a debit/credit card which enables money to be debited from a user's bank account.

Whatever type of card is used, fraudulent or unauthorized use of such cards is a common problem, with significant consequences to the financial institutions issuing the cards.

It is known, for example, to insert a card shaped device into a card reader, which causes a card subsequently inserted into the card reader to become jammed when the reader attempts to return the card to the user. Both the card shaped device and the jammed card can then be removed from the card reader by an unauthorized person, utilizing a specially designed tool. The card can then be used fraudulently in an ATM if the PIN associated with the illegally removed card is known.

Even if the PIN is not known it may still be possible to make use of a multipurpose card either as a cheque guarantee card or as a debit/credit card, as only the user's signature is required in order to authorize a transaction with such cards.

SUMMARY OF THE INVENTION

It is an object of the present invention to provide a card reader, which reduces the risk of magnetic stripe cards or smart cards being fraudulently used.

According to the present invention, there is provided a card reader including detection means for determining a predetermined irregular mode of operation, characterized by card invalidation means operable to render a card permanently non-usable in response to the detection of said predetermined irregular mode of operation.

BRIEF DESCRIPTION OF THE DRAWINGS

Embodiments of the invention will now be described, by way of example, with reference to the accompanying drawings, in which:

FIG. 2A is a schematic side view of a first embodiment of a card reader in accordance with the present invention, with a card inserted therein, including a card invalidation means comprising a deformation plate;

FIG. 2B is a schematic plan view of the card reader of FIG. 2A;

FIG. 5A is a schematic side view of a further embodiment of a card reader in accordance with the invention with a card inserted therein, wherein the invalidation means comprises hot air deformation means;

FIG. 5B is a schematic plan view of the card reader of FIG. 5A; and

DETAILED DESCRIPTION

Figure 1:
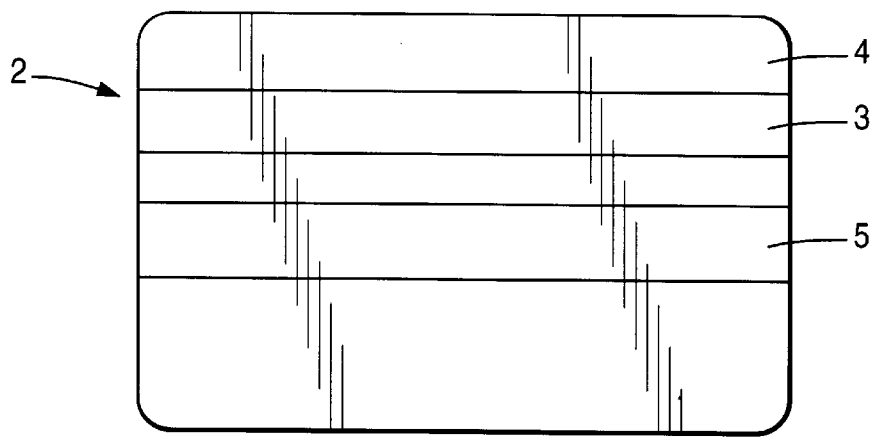
FIG. 1 is a schematic plan view of a magnetic stripe card.

FIG. 1 illustrates a magnetic stripe card 2 carrying a magnetic stripe 3 running along the length of the reference edge 4 of the card 2. Substantially parallel to the magnetic stripe 3 is a stripe 5 designed to receive the written signature of the authorized user of the card.

Most cards are substantially rectangular in shape being approximately 85 mm long and 55 mm wide.

FIGS. 2A and 2B illustrate a first embodiment of a card reader 10 in accordance with the invention. The card reader 10 is designed to read magnetic stripe cards, such as the card illustrated in FIG. 1. The invention is also applicable to card readers which read smart cards; however, for simplicity the invention will be described herein only in terms of a magnetic stripe card reader.

Figure 3:
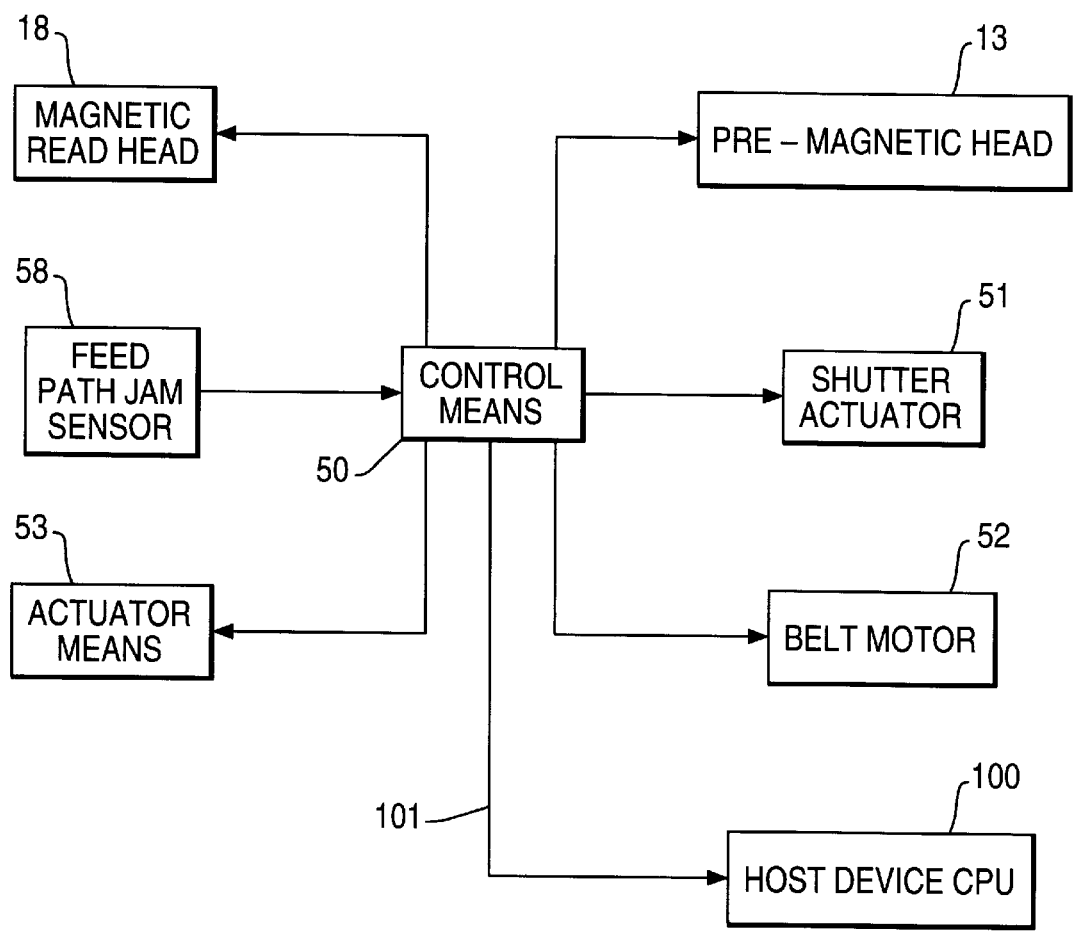
FIG. 3 is a block diagram of parts of a card reader in accordance with the present invention.

The card reader 10 is designed to be incorporated in a host device, for example an ATM, and connected to a central processor unit (CPU) 100 (FIG. 3) in the host device via is connection means 101, thus enabling communication between the reader and the CPU 100 in the host device.

The reader 10 includes an input slot 11 dimensioned so as to receive the card 2. When not in use, access to the interior of the reader 10 is prohibited by means of a retractable shutter 12, the shutter 12 being retractable so as to enable the card 2 to be received into the interior of the reader 10.

The shutter 12 is located approximately 2 cms behind the slot 11. In the space between the slot 11 and the shutter 12 is located a pre-magnetic head 13, which detects whether or not a card 2 inserted into the slot 11 has a magnetic stripe 3, and sends a signal to that effect to a control means 50 in the reader 10. The position of the shutter 12 is controlled by a shutter actuator 51 (FIG. 3), which is operable under the control of the control means 50. If the pre-magnetic head 13 fails to detect a magnetic stripe 3, then the shutter 12 will not be retracted and access to the interior of the reader 10 will be denied.

The reader 10 incorporates card feed means 14 in the form of a first pair 15 and a second pair 16 of co-operating belt means which receive the card 2 adjacent the shutter 12 and convey the card 2 along a feed path 17. The belt means 16 grip the card 2 near the reference edge 4 and the belt means 15 grip the card 2 near the edge opposite thereto, to feed the card 4 along the feed path 17.

A magnetic stripe read-head 18 is located in the reader 10 so that the magnetic stripe 3 of a card 2 when transported along the feed path 17 passes above the read head 18, which can read the data therefrom. The read-head 18 detects the changes in magnetism along the length of the stripe 3 and provides an electrical signal in response thereto to the control means 50, the signals being representative of the data stored in the stripe 3, as is well known to persons skilled in the art.

In normal operation passage of the card 2 from the slot 11 throughout the reader 10 is monitored by the central processor 50 via an array of optical detectors 58, which are located along the feed path 17, from the shutter 12 to a location beyond the magnetic head 18 where the card 2 is stored prior to being returned to the user, during normal operation of the reader 10.

When the data has been read from the magnetic stripe 3, and an authorized user has completed a valid transaction with the host device, the reader 10 will attempt to return the card 2 to the slot 11 for removal by the user. As the card 2 is returned to the slot 11 the control means 50 causes the shutter 12 to be retracted and the card 2 to extend through the slot 11. The belt motor 52 is controlled to stop the card 2 from being expelled totally from the reader 10.

State of the art card readers operate largely as described above. A card reader in accordance with a first embodiment of the present invention is further provided with a movable deformation plate 21 located behind the shutter 12 (FIG. 2A), which can be actuated to invalidate a card 2 jammed in the reader 10 once the control means 50 determines that the card 2 has been jammed intentionally at the shutter 12, as will be described in detail below.

If the card 2 is jammed, say at the shutter 12, then the detector 58' adjacent the shutter 12 will detect the prolonged presence of the card 2 beneath the shutter 12, and will send a signal to this effect to the central processor 50.

The optical detectors 58 each comprise a light emitting diode (LED) 581 and an optical sensor 582 which is arranged to detect light emitted by the LED only if the light is reflected from the surface of a card 2 located in the feed path 17 above the detector 58.

If a card shaped device has been inserted into the space between the slot 11 and the shutter 12, the card 2 will become jammed beneath the shutter 12, with a portion of the card 2 extending beyond the shutter 12. Thus a person utilizing a specially designed tool could then remove the card shaped device and the card 2 from the reader, as discussed above.

A first embodiment of a reader 10 in accordance with the present invention is adapted to address this problem by providing the reader 10 with a card invalidation means in the form of a deformation plate 21, as mentioned above, which is actuable under the control of the control means 50 to damage a card 2 which is jammed in this manner.

The plate 21 is located, usually, in a retracted position above the feed path 17 in the card reader 10 behind the shutter 12 as shown in FIG. 2A. When a card 2 is jammed in the feed path 17, as discussed above, the presence of the card 2 at the shutter 12 is detected by the sensor 58' adjacent the shutter 12, whereupon the control means 50 sends a signal to the plate actuator means 53 which actuates the plate 21 which is urged down onto the card 2 with sufficient force to deform permanently the card 2, such that the card 2 will not be reusable.

Figure 4A:
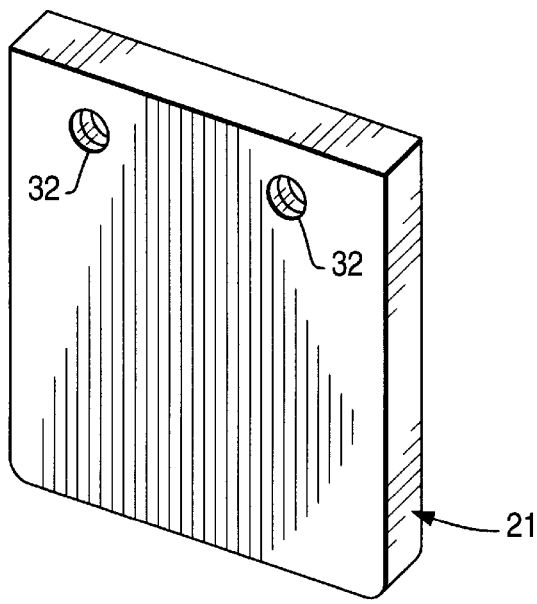
FIG. 4A is an enlarged perspective view of the deformation plate of FIG. 2.
Figure 4B:
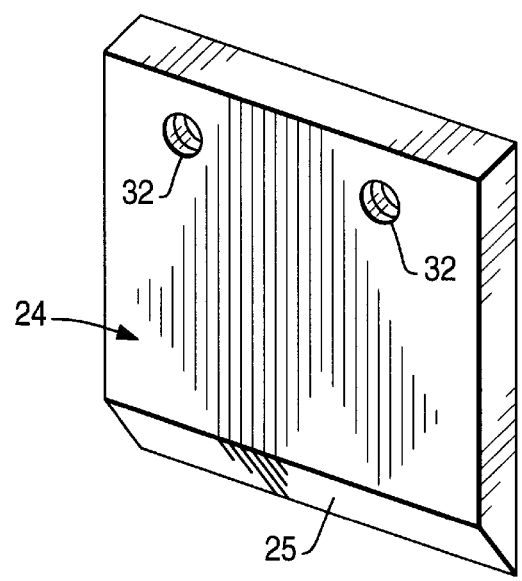
FIG. 4B is an enlarged perspective view of a cutting blade which can be utilized as the invalidation means in the reader of FIG. 2 instead of the deformation plate.

The plate 21 (FIG. 4A) can be replaced by a blade 24 with a cutting edge 25 (FIG. 4B) such that when the blade 24 is urged down into contact with the card 2 the card is cut into two pieces. Both the plate 21 and the blade 24 are attached to movable means (not shown) in the reader 10 by screws (not shown) which are received through screw holes 32 located remote from the edge of the plate 21 or blade 24 which engages the card 2 when in use.

Figure 5C:
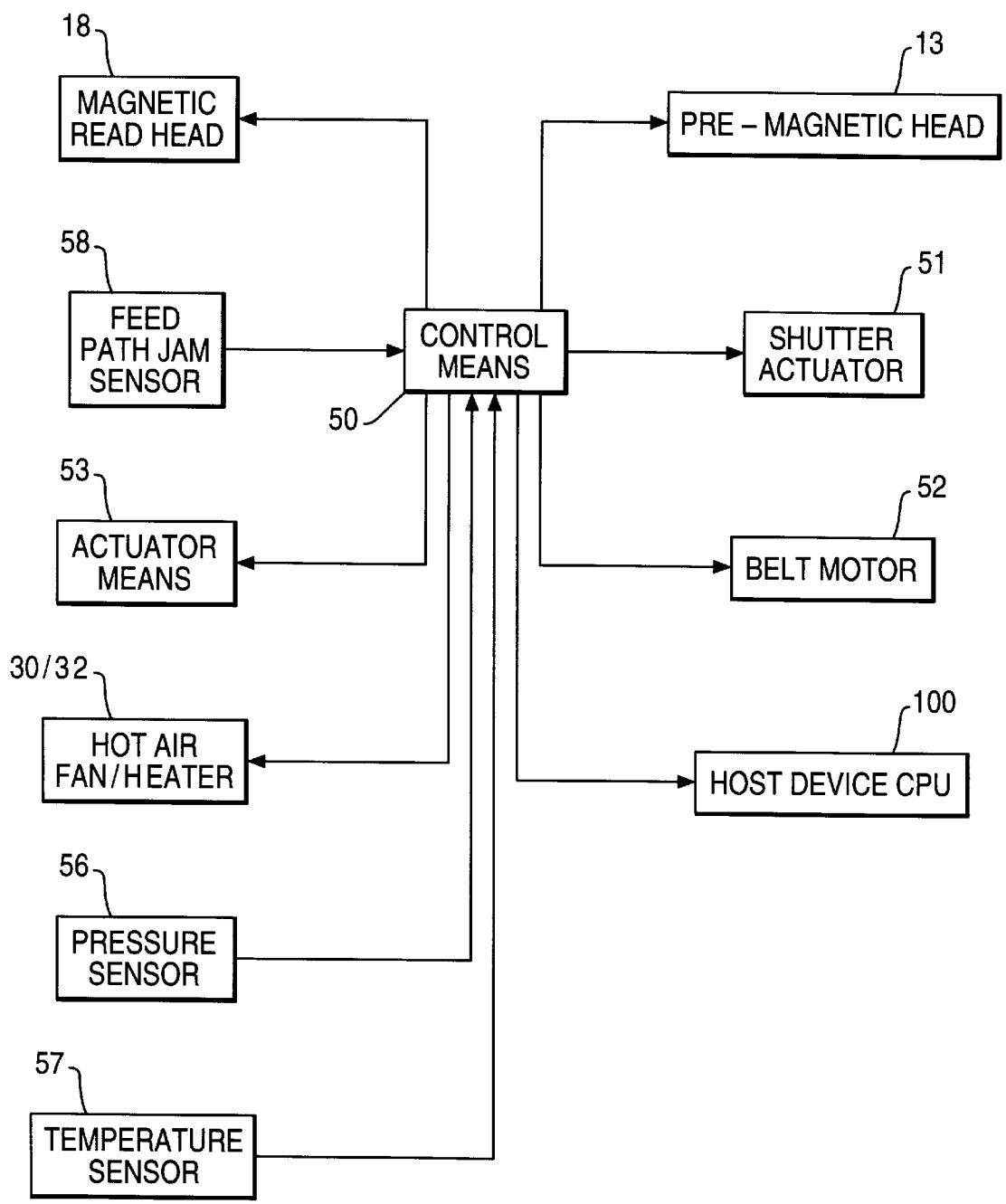
FIG. 5C is a block diagram of the card reader of FIGS. 5A and 5B.

In a further embodiment of the present invention, illustrated in FIGS. 5A and 5B, and with reference to FIG. 5C, the card reader 10 is provided with a hot air nozzle 26 located just behind the shutter 12, in place of the invalidation means 21, 24. In all other respects the card reader 10 of FIGS. 5A and 5B operates in the same manner as the card readers of FIGS. 2A and 2B.

The hot air nozzle 26 is arranged to focus air forced through the nozzle. The nozzle 26 is connected to a flexible tube 28 which is in turn connected to a source of hot air in the form of a fan 30 and a heater 32 which heats the air produced by the fan 30. When a card 2 is jammed in the reader 10 at the shutter 12 as detected by the detector 58' (FIG. 5A), the control means 50 will cause a hot air actuation means 53 (FIG. 5C) to actuate the supply of hot air resulting in a controlled and focused blast of hot air being issued from the nozzle 26, thus distorting the plastic card 2. Such distortion of the card 2 renders the magnetic stripe 3 unreadable, and therefore the card 2 invalid.

The card reader 10 is also provided with both an air pressure sensor 56 (FIG. 5C) and an air temperature sensor 57, to ensure that only the required degree of deformation of the card 2 is produced. The air pressure sensor 56 will also detect any blockage of the air nozzle 26, and transmit a signal to this effect to the control means 50 which will then close down the reader 10 to ensure that the aforementioned fraudulent removal of a card 2 can not be attempted while the invalidation means may be ineffective.

The card reader 10 will not accept a subsequently tendered magnetic stripe card when any one of the detectors 58 detect that a card 2 is present in the feed path 17. Thus the invalidation means within the reader 10 can not be inadvertently actuated to damage a validly inserted card.

Such invalidated cards will not only be inoperative with ATMs. but will also not be usable as a cheque guarantee card, debit/credit card or any other sort of data card.

What is claimed is:

1. A card reader comprising:
   detection means for detecting a predetermined irregular mode of operation; and
   card invalidation means other than a magnetic write head for rendering a card permanently non-usable when a predetermined irregular mode of operation is detected, the card invalidation means including actuatable hot air means for, when actuated, heating a card to a sufficient temperature to physically deform the card.

2. A card reader according to claim 1, further comprising (i) an air pressure detector for detecting the pressure of air expelled by the hot air means, and (ii) means for shutting down operation of the card reader when the pressure of air expelled by the hot air means lies outside of a predetermined acceptable range.

3. A card reader comprising:
   a detector for (i) detecting a predetermined irregular mode of operation, and (ii) providing a signal indicative thereof; and
   a card deforming device for physically deforming a card to render the card permanently non-usable when the detector provides the signal indicative of a predetermined irregular mode of operation, the card deforming device including actuatable hot air means for, when actuated, heating a card to a sufficient temperature to physically deform the card.

4. A method of handling a user's card at an automated teller machine (ATM), the method comprising the steps of:
   (a) receiving the card from a user;

(b) detecting a predetermined irregular mode of operation when the card is received from the user; and (c) heating the card to a sufficient temperature to physically deform the card to render the card permanently non-usable when a predetermined irregular mode of operation is detected.

* * * * *